MAGNETIC DEVICE SENSING, SHIFTING AND ENCODING CIRCUIT

Filed Nov. 24, 1959 3 Sheets-Sheet 1

INVENTORS
ABRAHAM FRANCK
GEORGE F. MARETTE
BERC I. PARSEGYAN
BY
Cushman, Darby & Cushman ATTORNEYS

MAGNETIC DEVICE SENSING, SHIFTING AND ENCODING CIRCUIT

Filed Nov. 24, 1959 3 Sheets-Sheet 2

BY Cushman, Darby & Cushman ATTORNEYS

MAGNETIC DEVICE SENSING, SHIFTING AND ENCODING CIRCUIT

Filed Nov. 24, 1959

INVENTORS
ABRAHAM FRANCK
GEORGE F. MARETTE
BERC I. PARSEGYAN
BY Cushman, Darby & Cushman
ATTORNEYS 3,098,217
MAGNETIC DEVICE SENSING, SHIFTING AND ENCODING CIRCUIT Abraham Franck and George F. Marette, Minneapolis, and Berc I. Parsegyan, St. Paul, Minn., assignors to Sperry Rand Corporation, New York, N.Y., a corporation of Delaware Filed Nov. 24, 1959, Ser. No. 855,219
25 Claims. (Cl. 340—172.5)

This invention relates generally to circuits which examine a number in any binary representation and operate on that number according to the results of the examination. More specifically, storage devices are arranged in a logical array to locate significant digits in a binary number, to cause the number to shift so as to place the significant digit in a preselected position, and, if desired, to record the number of digits shifted.

The operation of this inventon may be best explained by first describing some exemplary operations performed by a digital computer on a binary number, more commonly referred to as a word. One such operation is that of scale factoring. This operation may also be referred to as normalizing, depending on the particular number representation which is used. In both scale factoring and normalizing the word is examined to determine the location of its most significant information digit. The entire word is then shifted until this digit is in the highest order non-sign position and the amount of this shift is stored in an auxiliary register. If the word is given in a complement representation, such as one's or two's complement, the operation is referred to as scale factoring. On the other hand, if the word is represented in magnitude and sign form, the operation is then referred to as normalizing. Other related operations that might be performed would be locating the least significant information digit and shifting the work accordingly, or locating a predetermined information digit within a certain field or part of a word.

For purposes of this description the one's complement representation is used. This implies that the leftmost bit of a binary word is the sign bit, "1" for negative numbers and "0" for positive numbers. Thus, for negative numbers the most significant information bit is the leftmost "0" and for positive numbers the leftmost "1" is the most significant information bit. It should be noted that the techniques used in this description are also applicable to other number forms, such as the two's complement and binary coded representation.

Only one application, that of scale factoring as applied to the one's complement representation, is described herein. The device, however, is not limited to this application. With minor changes, which will become apparent, the circuit can be made to perform any of the aforementioned applications, plus any other applications based upon determining the location of a predetermined digit within a word under controlled conditions. The shifting operation is not restricted to left open-ended shifts, but may be right or left and circular or open-ended in nature. It is to be noted also that the encoding device used to encode the shift count to a binary number, as described herein, is not limited to numbers represented in the one's complement form. The encoding feature can be applied to other number representations as well, using the basic principles which are hereinafter described.

In this invention, the word is held in a bistable input register of any conventional type. An output indicative of the state, "1" or "0," of each bit of the word is fed into a Conditional Complementer (CC). The latter may consist of at least two saturable transformer devices, for example, a pair of deposited magnetic films, for each digit of the word, two pulse generators, pulse current lines, and sensing lines. Saturable transformer properties of the films are utilized in the complementer. The arrangement is such that if the digital word input is negative, as determined by the value of the sign bit or digit, the output of the CC is the complement of the word, whereas with a positive word the exact duplicate of the word appears on the CC output. The Complementer outputs are fed into a group of generators which in turn provide current pulses to a matrix array of variable state devices such as magnetic films in which the reversible rotation properties thereof are used. One row of films in the array contains the negative copy of the word, whereas the remaining rows all contain positive copies of the word. The absence of electrical signals on a group of sense lines arranged to link a portion of the films in the array determines the position of the most significant digit. This information is used to determine the amount of shift required via an encoder which also utilizes the saturable transformer devices, e.g., thin magnetic films operated as saturable transformer devices. In addition, the information also initiates the proper shifting by utilizing a portion of the saturable transformer devices in the array and another CC.

From the foregoing, it can be seen that an object of this invention is to provide a novel circuit which is capable of performing both a sensing and a shifting operation on a binary number.

Another object of this invention is to utilize the small size, low power consumption, and high speed advantages of thin magnetic films to provide a circuit capable of performing a normalizing or scale factoring operation.

A further object of this invention is to provide a novel circuit for performing an encoding operation.

Addiitonal objects and the entire scope of the invention will become more fully apparent from the following detailed description of an exemplary embodiment, and from the appended claims. The exemplary embodiment can be best understood with reference to the accompanying drawings, wherein:

Figures 1, 2, 3A:
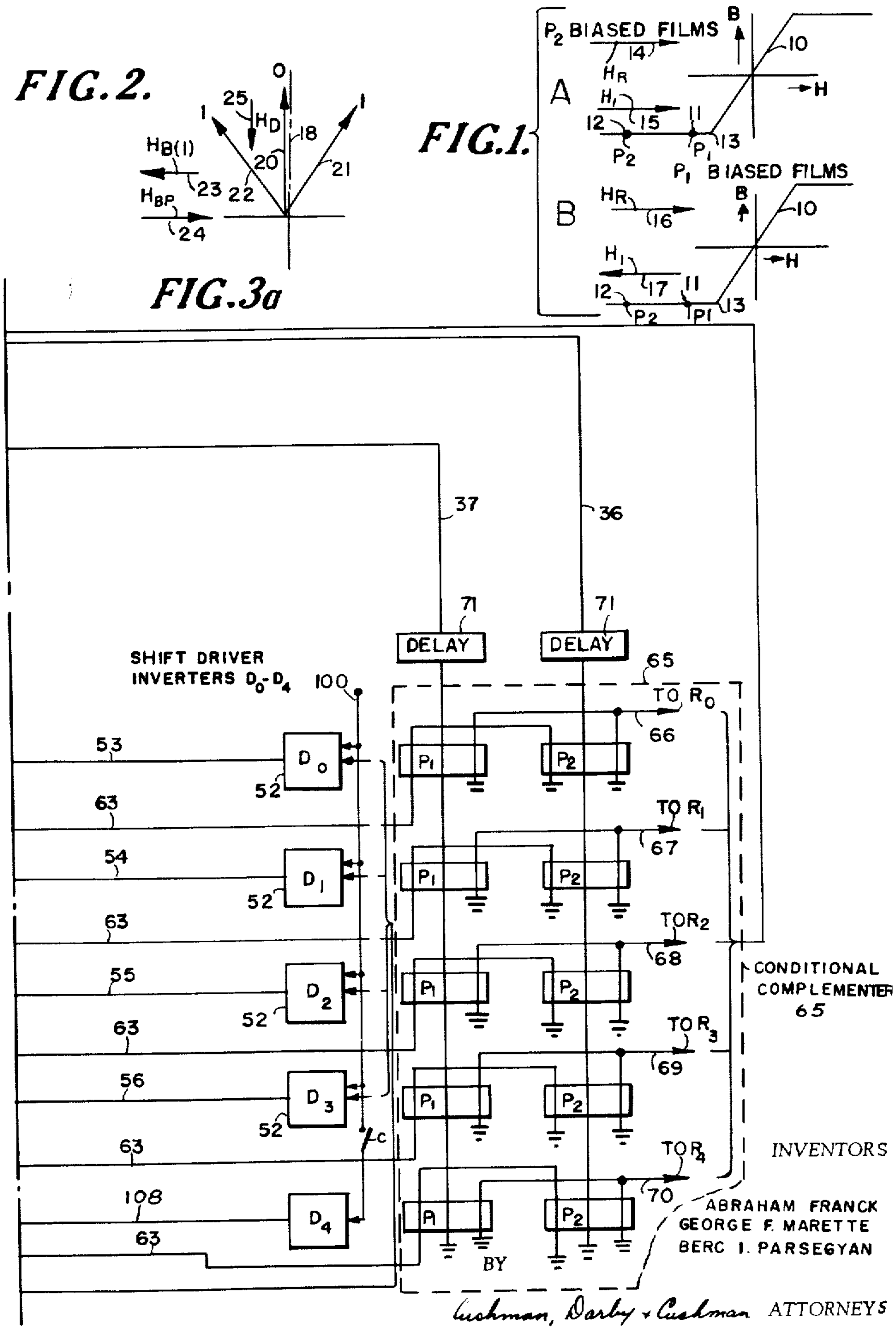
FIGURE 1 illustrates the saturable transformer properties of magnetic films.
FIGURE 2 illustrates vectorially the reversible rotation properties of magnetic films.
Figure 3B:
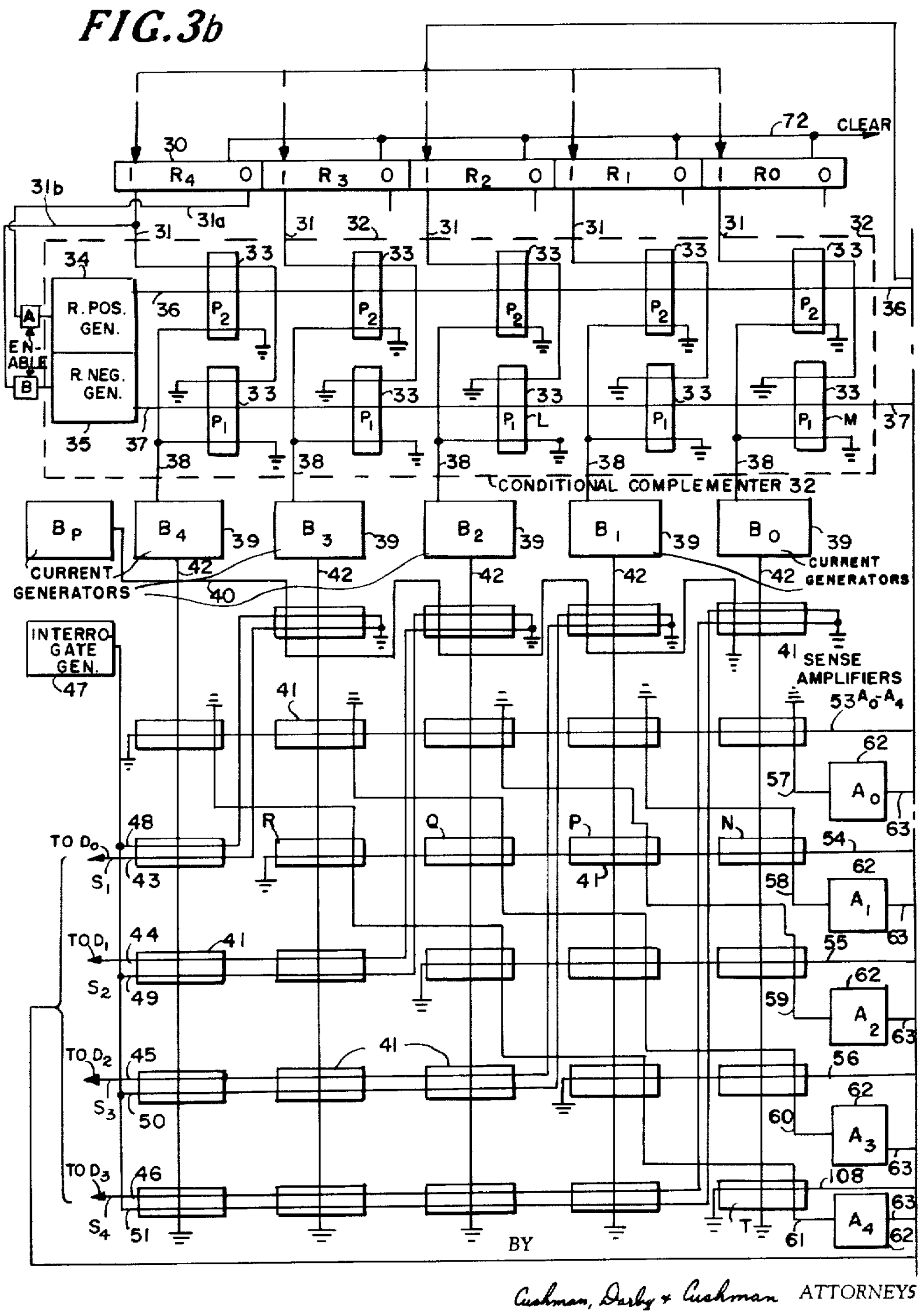
FIG. 3 is a representation of the orientation of FIG. 3*a* and FIG. 3*b*.
Figures 5, 5A:
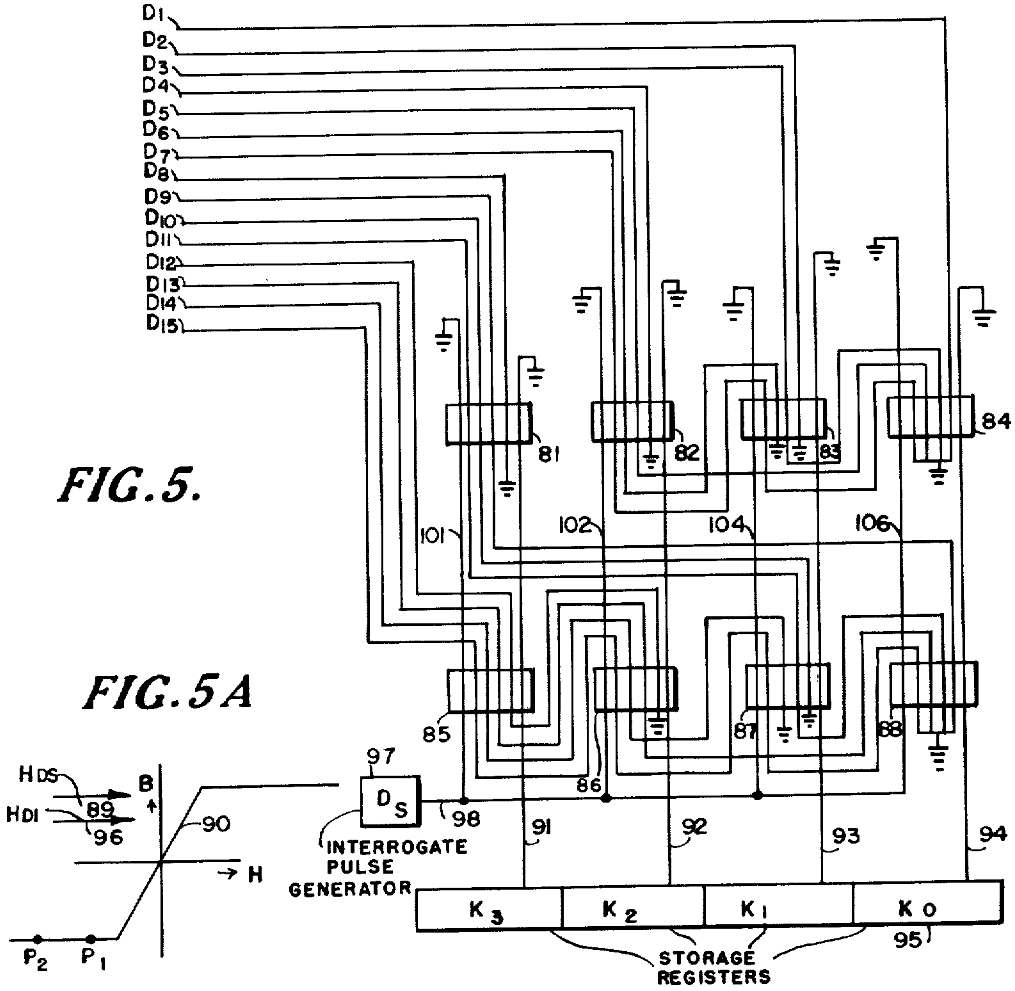
Figure 4:
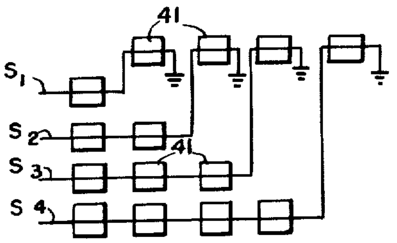

FIG. 3*a* and FIG. 3*b* is a circuit diagram of a portion of the exemplary embodiment of this invention;

FIGURE 4 is an aid in showing a portion of the sense line arrangement;

FIGURE 5 is the circuit diagram of an encoder, which is the remainder of the exemplary embodiment; and FIGURE 5A illustrates characteristics of magnetic films used in FIGURE 5.

In the patent application of Sidney M. Rubens, Serial No. 599,100, filed July 20, 1956, now Patent Number 2,900,282, there is described a method of preparing thin ferromagnetic films having the previously mentioned properties. Rubens application, Serial No. 626,945, filed December 7, 1956, now Patent No. 3,030,612, further describes the general method of constructing operable thin film devices wherein printed circuits as the current carrying conductors are used.

In the co-pending application of W. W. Davis et al., Serial No. 855,206, filed November 24, 1959, there is contained a detailed description of the saturable transformer properties of thin films, and the co-pending application of Pohm, Arthur V., Serial No. 855,220, filed November 24, 1959, describes the reversible rotation properties thereof. However, a brief description of the utilization of these properties in this application may be helpful.

In FIGURE 1, 10 depicts an idealized hysteresis loop of a thin magnetic film when operated along its difficult axis. The film magnetization may be originally biased to points 11 or 12, which are the $P_1$ and $P_2$ states, respectively. Depending on which state the film is in, an applied field may or may not cause it to move past the knee 13 of the hysteresis loop. For example, in FIGURE 1A, if the film is in the $P_2$ state, an $H_{(1)}$ field will cause the film magnetization to shift to $P_1$ and no voltage will be induced in a sense line which magnetically couples the film. If the film were in the $P_1$ state, an $H_{(1)}$ field would shift the magnetization past the knee and at least partly up the diagonal portion of the hysteresis loop. This would induce a substantial voltage in a sense line inductively coupled thereto. The same analysis is applicable to FIGURE 1B where a field $H_{(1)}$, in the reverse direction, is applied. With the film magnetization biased to either $P_1$ or $P_2$, this $H_{(1)}$ field causes no sense line output signal to result.

Reference to FIGURE 2 will aid in understanding the reversible rotation properties of the aforementioned films. The preferred magnetic axis of the film is represented by dashed line 18. All films which have their magnetization lying parallel to line 18, e.g., the direction indicated by vector 20 are said to be in one magnetic state, arbitrarily defined herein as the "0" state. All films which have their magnetization lying at an angle to line 18, e.g., the directions indicated by vectors 21 and 22 are said to be in another magnetic state, arbitrarily defined herein as the "1" state. A field such as the field indicated by vector $H_D$ labelled 25 applied parallel to the preferred axis 18 will cause no rotation of the magnetization of those films lying in the above defined "0" state, assuming that if the field is directed anti-parallel to the "0" state it is insufficient to completely switch the film. However, any field applied at an angle to the magnetization of a film will cause it to rotate due to the transverse field component thereof. In FIGURE 2 these transverse fields are represented by vectors $H_{B(1)}$ and $H_{BP}$ labelled 23 and 24, respectively. By suitably arranging a sense winding which is inductively coupled to the film, the abovementioned rotation will cause a voltage to be induced therein. As before mentioned, the reversible rotation of thin films is more explicitly treated in the above referenced application.

The following description applies to an embodiment of this invention to perform a scale factoring operation. Subsequently, it will be shown how slight modifications will result in circuits to perform other operations involving sensing and shifting. In addition, those of ordinary skill in the art will readily perceive adaptations of the teachings of this invention to other functions after reading the following description.

Referring now to FIGS. 3*a* and 3*b*, the digital word is contained in the Input Register 30. In general, this register may have *n* bistable stages, where *n* is any desired integer. In FIG. 3*b* there are shown 5 stages, it being understood there may be as many stages as desired, five being used only as an example. The bits or stages in the register are labeled $R_0$ through $R_4$, from right to left, with $R_0$ being the least significant and $R_4$ the sign stage or bit. For exemplary purposes, the stages thereof are representative of the binary word, 11010, $R_4$ representing a "1," $R_3$ a "1," $R_2$ a "0," $R_1$ a "1" and $R_0$ a "0." Since the leftmost bit, the sign bit, is a "1" the word is negative. The absolute value of the word is 00101. Therefore, the most significant information bit is in $R_2$. Since the operation to be described is a scale factoring operation, at the completion of the operation the input register or an auxiliary register should contain the word 10101. The word will have been shifted so that the most significant digit (MSD) will have been placed immediately adjacent to the sign bit position and the other digits shifted accordingly.

Each of the bits of the Input Register has an output line 31 feeding the Conditional Complementer (hereinafter CC) enclosed by dashed line 32. All of the rectangular boxes shown in FIGS. 3*a* and 3*b* represent thin films unless otherwise labeled. The lines 31 are preferably printed circuit lines, and each magnetically couple two films in the CC 32. These lines must be oriented as shown with respect to the other lines coupling the films. In addition, it is necessary that orientation of the lines be such, with respect to the preferred or easy axis of magnetization of the films, as to produce the required direction of fields as shown by vectors 14–17 and 23–25 in FIGURES 1 and 2 respectively. The saturable transformer devices, i.e., films 33, in the CC 32, are originally biased, by current carrying lines not shown, to the $P_2$ or $P_1$ state as labeled. Those bits in the Input Register which contain a "1," namely $R_4$, $R_3$, and $R_1$, produce a current on their associated output lines 31. The effect of these currents on the films can be determined by looking at FIGURE 1. The field produced by the current in line 31 is the $H_{(1)}$ field, shown by vectors 15 and 17 in FIGURES 1A and 1B respectively. Since FIGURE 1A depicts the $P_2$ biased films, it can be seen that the $H_{(1)}$ field will move the bias point from point 12 to 11, from the $P_2$ to the $P_1$ state. Since line 31 is physically oriented to carry current through the $P_1$ biased films in the direction opposite to that in the $P_2$ biased films, the effect of $H_{(1)}$ on the former is to move the bias point from $P_1$ to $P_2$, as can be seen from FIGURE 1B. Subsequent to the above described step, the sign bit of the word in the Input Register is sensed. Since in this exemplary case it is negative, $R_4=1$, the R (negative) generator 35 is activated by a signal on line **31*b* which is passed through "AND" gate B by enabling means not shown, sending a current through line 37 which magnetically couples all $P_1$ films in the CC 32. Referring back to FIGURE 1B, the effect of the field $H_R$, shown by vector 16, produced by the current in line 37 is to cause those films which had been previously shifted from the $P_1$ state to the $P_2$ state to shift back to the $P_1$ state. Films L and M,, which had remained in the $P_1$ state, will shift along the rising slope of the hysteresis loop 10. Output sense lines 38 which magnetically couple the latter two films will have a voltage induced thereon. If it be arbitrarily stated that a voltage present on output line 38 indicates a "1" and no voltage is indicative of a "0," it can be seen that the output of the CC 32 is the word 00101, which is the complement of the original word. By similar analysis, a "0" stored in stage $R_4$ activates positive generator 34 through line 31*a* and "AND" gate A and output of the CC 32** is a duplicate of the original word.

The output of the CC 32 feeds a plurality of generators 39, labeled $B_0$–$B_4$, with one generator for each bit of the original word. Another generator, $B_p$, is identical to the $B_0$–$B_4$ generators. The $B_p$ generator is always active, thereby providing a current on line 40, which line magnetically couples all the films in the top row of an array of thin film devices 41. This row is to contain a negative copy of the positive word. Line 40 is oriented and the current therethrough is in a direction so as to produce magnetic field $H_{BP}$, shown by vector 24 in FIGURE 2. The effect of $H_{BP}$ is to rotate the magnetic state of all the films in the negative row to the position as shown by vector 21 so as to bias them to that position. Alternatively, the films in the negative row may be physically oriented so that the preferred axis would be in the direction of vector 21. This would eliminate the necessity of the $B_p$ generator.

Continuing with the above example, generators $B_2$ and $B_0$ are activated by the voltage pulse present on their input lines 38. Generators $B_1$, $B_3$, and $B_4$ remain in their quiescent state. A current appears on the output lines 42 of generators $B_2$ and $B_0$, which lines magnetically couple all the films in the column associated with each generator. The direction of the current through lines 42 must be such as to provide a magnetic field equal in amplitude and opposite in direction to that of $H_{BP}$. Such a field, $H_{B(1)}$, is shown as vector 23 in FIGURE 2 and is of predetermined strength to result in a rotation of vector 21 back into alignment with the preferred axis, vector 18. As stated previously, those films which have their magnetization vectors in alignment with the preferred axis are said to be in the "0" state. All others are in the "1" state. Therefore, it can be seen that the word existing in the negative row of films is 1010, which is the copy of the original negative word (same as negative copy of positive word), recalling that the leftmost bit of the original word is the sign bit.

Following the lines 42 through the remaining films 41 in the array to which each line is magnetically coupled, it can be seen that those films, other than in the negative row, which are coupled to the output lines from generators $B_2$ and $B_0$ will have their magnetic axes rotated away from alignment with the preferred axis, "0" state, into a position indicated by vector 22 in FIGURE 2. The result is that the films, other than those in the negative row, are biased to a state which is the complement of the associated bit in the original word. By similar analysis, it is apparent that if the original word were positive, the negative row of films would be biased so as to contain the complement of each associated bit, whereas the remainder of the films would contain the duplicate of each associated bit of the original word. In other words, the negative row contains a negative copy of the positive word, whereas the remainder of the array contains a positive copy.

Sense lines 43–46 labeled $S_1$–$S_4$ are arranged in such a manner that they couple one film in the negative row and one film in each column to the left of that position. Reference to FIGURE 4 will aid in visualizing the sense line arrangement. Lines labeled $S_1$–$S_4$ in FIGURE 4 correspond to those similarly labeled in FIG. 3*b*, whereas the films 41 in FIGURE 4 correspond to the films linked by the sense lines. From FIGURE 4 it can be seen that one sense line, e.g., line $S_1$, couples in common one of the films in the first row and the preceding one in the second row. Another sense line, e.g., line $S_2$, couples in common another one of the films in the first row and two of the devices in the third row and so forth to have each succeeding sense line coupled in common to one film of the first row and one additional number of films in the additional row. Sense line $S_2$, 44 in FIG. 3*b*, is the only sense line which links films which are all in the "0" state. An interrogate generator 47, has output lines 48–51 which respectively are magnetically coupled to the same films as sense lines 43–46. Activation of generator 47 causes a current to flow through its output lines which causes field $H_D$, shown as vector 25 in FIGURE 2, to be applied to each of the films that said output lines couple. Note that field $H_D$ is applied parallel to the preferred axis 18, along which the magnetization of the "0" state films exist. Those films which are in the "0" state will be substantially unaffected by the application of $H_D$ whereas those films in the "1" state, as shown by vectors 21 and 22, will have their magnetic state vectors rotated. This rotation will induce a voltage in the sense line coupling the film. Since sense line 44 is the only sense line which magnetically couples films in the "0" state only, it will be the only sense line with no voltage induced thereon. No voltage signal indicates the position of the most significant digit. It is important to note that sense lines 43–46 must be oriented so that they are physically substantially parallel to generator output lines 48–51 when coupling the films. This results in the magnetic axis vector of the sense line being parallel to the preferred axis of each film, the preferred axes being aligned in a direction parallel to the length of page, so that the vertical component of the change in the magnetization direction due to rotation of the films in the "1" state induces a voltage on the sense line. This is to prevent cancellation by signals of opposite polarity induced in the sense line.

Sense lines $S_1$–$S_4$ are wired to the inputs of the Shift Driver Inverters, 52, labeled $D_0$–$D_3$, with sense line $S_1$ going to $D_0$, $S_2$ to $D_1$, $S_3$ to $D_2$ and $S_4$ to $D_3$. A signal input to the Shift Driver Inverters results in no output therefrom whereas no signal at the input results in an output current pulse. Therefore, driver output line 54, corresponding to an input from sense line $S_2$, will be the only line carrying a current pulse. Note that all the lines 53–56 magnetically couple the films in the matrix which are not coupled by the interrogate generator output lines 48–51 and sense lines 43–46. This fact is mentioned here to point out that only a portion of the array is required for sensing purposes to determine the MSD while the remainder is required to perform the shifting. Enable line 100 is activated by a pulsing source, not shown, concurrently with the interrogate generator 47. This prevents any signal from appearing on the output lines 53–56 of the Shift Driver Inverters except during the time of interrogation.

The current on line 54 produces field $H_D$, shown as vector 25 in FIGURE 2, which causes rotation of the magnetic vectors of those films which are in the "1" state. Line 54 magnetically couples films N, P, Q and R with N and Q being in the "1" state. Sense lines 57–61 are provided to magnetically couple all the films not linked by sense lines 43–46 and are inputs to amplifiers 62, $A_0$–$A_4$ respectively. Sense lines 58 and 60 link films N and Q respectively. Therefore, amplifiers $A_1$ and $A_3$ are the only amplifiers with output signals. The output lines 63 from the amplifiers are inputs to another Conditional Complementer (CC) enclosed by dashed line 65.

Lines 36 and 37 also couple CC 65 and therefore, the output of the CC 65 is conditioned upon the original input word in the Input Register 30; the output being the complement of the input when the original word is negative and an exact copy of the input if the original word is positive, as explained hereinbefore. If it be assumed that the presence of a signal indicates a "1" while the lack of a signal is indicative of a "0," then the input to CC 65 corresponding to the outputs from amplifiers $A_0$–$A_4$ respectively is 01010. The output from the CC 65 on output lines 66–70 respectively is 10101. These output lines are coupled back as inputs to the input register with line 66 as an input to $R_0$ bit, 67 to $R_1$, 68 to $R_2$, 69 to $R_3$, and 70 to $R_4$. Alternately, the outputs could be fed to the same bit positions in an auxiliary register. However, at a time prior to returning the output signals from lines 66, 67, 68, 69 and 70 respectively to $R_0$, $R_1$, $R_2$, $R_3$ and $R_4$, and after there is an output from conditional complementer 32, these register stages should be cleared to the "0" state. This is done by any conventional pulsing technique and in the preferred embodiment has been shown by connection of the "0" inputs of stages $R_0$–$R_4$ to a common clear line 72. This line may be pulsed by a separate source or by one of the sources already utilized in the preferred embodiment, e.g., the source activating line 100. Since $R_4$ is the leftmost bit position and $R_0$ the rightmost, the final word in the register is 10101, which is the proper word at the end of a scale factoring operation.

Delays 71 in lines 36 and 37 are required because of the delay between the output of CC 32 and amplifiers 62. The delays 71 insure that the conditioning signal on lines 36 or 37 has not appeared and disappeared prior to the time an output appears from amplifiers 62.

The foregoing described the sensing and shifting operation on a word in a scale factoring operation. As previously mentioned, it is also necessary to record the amount of shift. This is accomplished via the encoder circuit shown in FIGURE 5. The circuit of FIGURE 5 is for a 16 input encoder (zero being considered one input) whereas only a four input encoder is required for the scale factor circuit previously described. The sixteen input encoder is shown only to better illustrate the design principles involved for broader scope applications. The purpose of the encoder is to convert a signal on a single line into a numerical quantity. The following describes the use of saturable transformer devices, i.e., thin films, to obtain a binary representation of the amount of shift.

FIGURE 5A shows the saturable transformer properties of the thin films 81–88 of FIGURE 5. These properties are as described with reference to FIGURES 1A and 1B and as described in detail in the aforementioned co-pending application of W. W. Davis et al. All films are originally biased to the $P_2$ state by means not shown. Input lines $D_1$–$D_{15}$ are preferably of the printed circuit type and are coupled to discrete combinations of the films, e.g., $D_1$ is coupled to film 84, $D_2$ is coupled to film 83, $D_3$ is coupled to films 83 and 84 and so forth. The presence of a current pulse on an input line produces a field $H_{D1}$, shown by arrow 96, in FIGURE 5A, which is applied to the films magnetically coupled by that line. This will cause the bias point on those films to shift to the $P_1$ state. An interrogate generator 97 provides a current pulse on line 98. Line 98 is connected to lines 101, 102, 104, and 106 which together couple all the films in the encoder. The current pulse on line 98 produces a field $H_{DS}$, shown by arrow 89. Those films which are in the $P_1$ state will be further shifted along the diagonal portion of the hysteresis loop 90, thereby inducing a voltage pulse on the sense lines 91–94 coupling these films to each stage of the shift count register. The presence of a signal on the sense line will set the corresponding bit position of the shift count register 95 to a "1." Shift count register 95 has in general *n* stages, where *n* is an integer, it being understood that in FIGURE 5 only 4 stages $K_0$–$K_3$ are shown by way of example. The following example, a continuation of the previously described sensing and shifting steps, will aid in understanding the operation.

Input lines $D_1$–$D_{15}$ correspond to outputs from the Shift Driver Inverters 52 of FIG. 3*a* similarly labeled. That is, input line $D_1$ is coupled to an output from Shift Driver $D_1$, input line $D_2$ to Shift Driver $D_2$, etc. Input lines $D_4$–$D_{15}$ would be outputs from corresponding Shift Drivers where an expanded sensing and shifting matrix is required.

As previously described, Shift Driver $D_1$ is the only one which is activated by the sensing step. Since input line $D_1$ couples film 84 exclusively, this film is the only one shifted to the $P_1$ state, all others remaining at $P_2$. Activation of interrogate generator 97 provides a current pulse on line 98 which in turn produces field $H_{DS}$. This field causes film 84 to shift from $P_1$ along the diagonal portion of hysteresis loop 90 thereby inducing a voltage on sense line 94. All other films merely shift from $P_2$ to $P_1$ which produces no induced voltage on their sense lines. The $K_0$ bit position of Shift Count Register 95 is thereby set to a "1," all other bit positions remaining in their original "0" states, indicating a total shift of one.

A similar analysis shows that a shift count up to 15 can be registered and that, as required, expansion to larger values of shift count is readily apparent. For example, assume the sensing operation had resulted in an input on $D_{15}$. Since line $D_{15}$ couples films 85—88, all four films will be shifted to the $P_1$ state. The coincident application of field $H_{DS}$ produced by a current pulse on line 98 by the interrogate generator 97 will result in a voltage signal appearing on sense lines 91—94. All four bit positions, $K_0$-$K_3$, of the Shift Count Register will be set to a "1" so that the contents of said register will be 1111 which is the binary representation of decimal 15.

Figure 3:
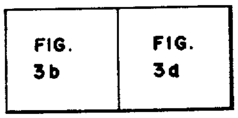

The foregoing has described the sensing, shifting and recording of the shift count. It should be understood that though the exemplary embodiment of FIGURE 3 is based on a five bit input word, no limitation thereto is intended. In addition, no limitation to size is intended by the exemplary embodiment of the Encoder of FIGURE 5. It should be also understood that the timing and gating controls which are required, are those that will be apparent to anyone of ordinary skill in the art.

A "Normalizing" operation will be possible with slight modification of the circuit of FIGS. 3*a* and 3*b*. Sense lines $S_1$–$S_4$, instead of going to Shift Drivers $D_0$–$D_3$ respectively, should go to the next higher order Shift Driver. That is $S_1$ should go to $D_1$, $S_2$ to $D_2$, $S_3$ to $D_3$, $S_4$ to $D_4$. Switch C is moved to its closed position connecting $D_4$ into the matrix and utilization is made of film T by coupling it through line 108 to $D_4$. Other uses of the teachings of this invention will be obvious to those of ordinary skill in the art.

Thus, it is apparent that there is provided by this invention a system in which the various objects and advantages herein set forth are successfully effected.

Modifications of this invention not described herein will become apparent to those of ordinary skill in the art upon reading this disclosure. Therefore, it is intended that the material contained in the foregoing description and the accompanying drawings be interpreted as illustrative and not limitative, the scope of the invention being defined in the appended claims.

What is claimed is:

1. Digital data analyzing and processing apparatus comprising an input register on *n* bistable stages for containing a digital word input, at least two data storage devices coupled to each stage, means coupled in common to one of the devices of each stage for causing the same to contain as a first row a digital word related digit by digit to said input word, a plurality of means each coupled in common to another one of the devices of each stage to cause each of said means to form other rows, each of said other rows containing a digital word related digit by digit to the complement of the digital word of said first row, a first plurality of sensing means, means coupling one of said sensing means in common to one of the devices of said first row and at least one of the devices of a first of said other rows, means coupling another one of said first plurality of sensing means in common to another one of the devices of said first row and to at least two of the devices of a second of said other rows and means respectively coupling each succeeding sensing means in common to one device of said first row and one additional number of devices of said other rows.

2. Apparatus as in claim 1 wherein said data storage devices are of the thin ferromagnetic film type.

3. Apparatus as in claim 1 including a plurality of interrogation means one for each of the other rows coupled to the outputs of the first plurality of sensing means, a second plurality of sensing means, one of said second plurality of sensing means coupled to at least one device of said other rows, another of said second plurality of sensing means coupled in common to at least two devices in said other rows and means respectively coupling each succeeding sensing means in common to at least one additional number of devices of said other rows, the arrangement being such that the signal from the outputs of the second plurality of sensing means may be used for shifting of the word in the input register.

4. Apparatus as in claim 3 wherein said data storage devices are of the thin ferromagnetic film type.

5. Apparatus as in claim 3 further including means coupling the outputs of the second plurality of sensing means to the input word register stages for altering the same to effect shifting of the word contained therein.

6. Apparatus as in claim 5 wherein said data storage devices are of the thin ferromagnetic film type.

7. Apparatus as in claim 1 further including a plurality of means for carrying signals representing the digits of said input digital word coupled one to each stage of the input register, an additional means for carrying signals representing the sign bit of the word coupled to the sign stage of the input word for a binary word input where said sign bit is a first valued signal for positive input numbers and a second valued signal for negative input numbers, a plurality of variable state devices, a first group thereof being biased into one state and a second group thereof being biased into a different state, means coupling in common at least two of said devices of different state to each of said means representing the digits and sign of said input word, means coupled to the sign representing means and in common to each device in said first group for altering the states thereof, and a plurality of output means each respectively coupled in common to the devices coupled to a single one of said signal carrying means and to each of said first mentioned two data storage devices for providing on said output means signals dependent upon the signals from the sign representing means, the output signals being representative of the value of the word in response to one of said valued sign bit signals, and representative of the complement of said word in response to the other valued sign bit signal.

8. Apparatus as in claim 7 wherein said data storing devices and said variable state devices are of the thin ferromagnetic film type.

9. Apparatus as in claim 1 and further including a plurality of input means respectively coupled to each of said first plurality of sensing means such that a signal on any one of said input means is representative of a different number according to one system of notation, a plurality of variable state devices, means coupling each of said inputs to discrete combinations of said variable state devices, means coupled to each of said devices for maintaining the same in a predetermined state, a count register of $n$ bistable stages, and a plurality of output means coupling all of said devices to said count register, each count register stage being coupled to at least one of said devices, the arrangement being such that a signal on a particular input means is indicative of the number of digits that the most significant digit of the input word must be moved and that number is recorded in binary representation in said count register.

10. Apparatus as in claim 9 wherein said data storing devices and said variable state devices are of the thin ferromagnetic film type.

11. Apparatus as in claim 3 and further including a plurality of means respectively coupled to each of said second plurality of sensing means for carrying signals representing the digits of the word represented on the outputs of said second plurality of sensing means, a plurality of variable state devices, a first group thereof being biased into one state and a second group thereof being biased into a different state, means coupling in common at least two of said variable state devices of different states to each of said signal carrying means, means coupled to the sign stage of the input digital word used for a binary word and in common to each variable state device in said first group for altering the states thereof, means coupled to the sign stage of the input digital word for a binary word and in common to each variable state device in said second group for altering the states thereof, said sign stage storing a first valued signal for positive input numbers and a second valued signal for negative input numbers, and a plurality of output means each respectively coupled in common to the variable state devices otherwise coupled to a single one of said signal carrying means and to a different input word register stage, the arrangement being such that dependent upon the signals from the sign stage of the input register, the signals on said plurality of output means are representative of the word represented by the signals on said second sensing means outputs in response to one of said valued sign signals and representative of the complement of said word in response to the other valued sign signal, and are returned to the input register for writing same thereinto.

12. Apparatus as in claim 11 wherein said data storing devices and said variable state devices are of the thin film ferromagnetic type.

13. Apparatus for selectively providing the complement of a binary word having $n$ digits or a copy of the word itself comprising a plurality of means for carrying signals representing the digits of said binary word, an additional means for carrying signals representing the sign bit of the word, said sign bit being a first valued signal for positive input words and a second valued signal for negative input words, a plurality of variable state devices, a first group thereof being biased into one state and a second group being biased into a different state, means coupling in common at least two of said devices of different state to each of said means representing the digits and sign of said word, means coupled to the sign value carrying means and in common to each device in said first group for altering the states thereof, means coupled to the sign value carrying means and in common to each device in said second group of devices for altering the states thereof, and a plurality of output means each respectively coupled in common to the devices otherwise coupled to a signal one of said signal carrying means, the arrangement being such that dependent upon the signals from the sign value carrying means, the signals on said plurality of output means are representative of the complement of said binary word in response to one of said valued sign bit signals and representative of said word in response to the other valued sign bit signal.

14. Apparatus as in claim 13 wherein said devices are saturable transformer devices.

15. Apparatus as in claim 13 wherein said devices are of the thin film ferromagnetic type.

16. Apparatus as in claim 15 wherein the devices are anisotropic and operated along the difficult axis thereof.

17. Digital data analyzing and processing apparatus comprising an input register of $n$ bistable stages for containing a digital word input, a plurality of means for carrying signals representing the digits of said digital word input coupled one to each stage of the input register, a plurality of variable state devices, a first group thereof being biased into one state and a second group thereof being biased into a different state, means coupling in common at least two of said devices of different state to each of said signal carrying means, means coupled to the signal carrying means which is representative of the sign digit of said digital word when it is in binary form and in common to each device in said first group for altering the states thereof, said sign digit being a first valued signal for a positive input number and a second valued signal for negative input words, a first plurality of output lines each respectively coupled in common to the devices coupled to a single one of said signal carrying means, signals from said first plurality of output lines being representative of the complement of said digital word input in response to one of said valued sign digit signals and representative of said word in response to said other valued sign digit signal, at least two data storage devices coupled to each of said first plurality of output lines, means coupled in common to one of the data storage devices of each of said first plurality of output lines for causing the same to contain as a first row a digital word related digit by digit to said digital word input, each other of said devices of each of said first plurality of output lines containing as another row a digital word related digit by digit to the complement of the digital word of said first row, a plurality of first sensing means, means coupling one of said first sensing means in common to one of the data storage devices of said first row and at least one of the devices of a first other row, means coupling another one of said first plurality of sensing means in common to another one of the devices of said first row and to at least two of the devices of a second other row, and means respectively coupling each succeeding first sensing means in common to one device of said first row and one additional number of devices of said other rows, a plurality of interrogation means one for each of the said other rows coupled to the outputs of the first plurality of sensing means, a second plurality of sensing means, one of said second plurality of sensing means coupled to at least one device of said other rows, another of said second plurality of sensing means coupled in common to at least two devices in said other rows, and means respectively coupling each succeeding one of said second plurality of sensing means in common to at least one additional number of devices of said other rows, a plurality of means respectively coupled to each of said second plurality of sensing means for conducting signals representing digit by digit the outputs of said second plurality of sensing means, a second plurality of variable state devices, a first group thereof being biased into one state and a second group thereof being biased into a different state, means coupling in common at least two of said variable state devices of different states to each of said signal conducting means, means coupled to the signal carrying means which is representative of the sign digit of said digital input word when it is in binary form and in common to each device in the first group of said second plurality of variable state devices for altering the states thereof, means coupled to the said sign signal carrying means and in common to each device in the second group of said second plurality of variable state devices for altering the states thereof, a second plurality of output means each respectively coupled in common to the devices of said second plurality of variable state devices otherwise coupled to a single one of said signal conducting means and to a different input register stage for returning the word represented by the combination of signals thereon digit by digit to said input register and writing the same thereinto, a plurality of input means respectively coupled to each of said first plurality of sensing means so that a signal on any one of said input means is representative of a different number according to one system of notation, a third plurality of variable state devices, means coupling each of said inputs to discrete combinations of the devices of said third plurality of devices, means coupled to each of the last mentioned devices for maintaining the same in a predetermined state, a count register of $n$ bistable stages, and a plurality of output means coupling all of said devices to said count register, each count register stage being coupled to at least one of said devices, the arrangement being such that the absence of a signal on a particular one of said first plurality of sensing means both produces a signal on a predetermined input means which is indicative of the number of digits the most significant digit must be moved, that number being recorded in binary representation in said count register and causes the input word digits to be rotated to the desired positions.

18. Apparatus as in claim 17 wherein said devices are of the thin ferromagnetic film type.

19. Apparatus for providing the complement of a binary word having $n$ digits or a copy of the word itself comprising a plurality of thin ferromagnetic film elements arranged in at least two rows, each element being anisotropic and being operated along its difficult axis, the elements in a first row being biased into one magnetic state, the elements in a second row being biased into a second magnetic state, a plurality of input lines inductively coupled to one element from each row of elements, each input line for carrying a signal representative of a predetermined digit of said binary word so that as a group the complete word is represented, one drive line coupled to an input line representative of the sign digit of said binary word and in common to each element in said first row of elements for altering the states thereof, said sign digit being a first valued signal for positive input numbers and a second valued signal for negative input numbers, another drive line coupled to an input line representative of the sign digit of said binary word and in common to each element in said second row of elements for altering the states thereof, and a plurality of output lines inductively coupled in common one to each of the elements otherwise coupled to a single input line, the arrangement being such that dependent upon a signal from an input line representing the sign digit of the binary word, the signals induced on the plurality of output means are representative of the complement of the binary word in response to one of said valued sign signals and representative of the word in response to the other of said valued sign signals.

20. A digital signal responsive device comprising: a plurality of input means for receiving a plurality of digital signals and being arranged in an ordered array; a first set of gating means respectively connected to the input means for effectively passing digital signals from the connected means representative of a first value; a second set of gating means each of which is connected to the input means for effectively passing digital signals from the connected means representative of the complement of said first value; a plurality of output circuit means indicative of the respective ordered input means and arranged in a manner identical to the ordered array and being responsively associated with the gating means for combining the passed signal of the first means connected to said respective indicated input means and such passed signals from all the second means which are associated with input means of a greater order than said respective means in the ordered array; the output means being so connected that a combined signal from the first and second means is provided in one output means for indicating the highest ordered input means having a first valued signal; and means operatively associated with all the output means and being responsive to said one combined signal to perform a digital signal manipulation peculiarly associative with the first valued signal in the higher ordered input means.

21. Apparatus as in claim 20 wherein the signal manipulation means is operatively associated with the input means such that the combined signal is changed to represent said second value.

22. A digital signal responsive device comprising: a plurality of signal receiving means arranged in an ordered array for receiving a plurality of digital signals, each of said signals characterized by one of at least two possible voltage values, a first group of signal responsive devices respectively connected to the receiving means and being responsive only to a received digital signal of a first value for providing first signals; a second group of signal responsive devices connected to the input means for being responsive to digital signals indicative of the other one of said valued signal to provide second signals; each of the first responsive devices being operatively associated wtih at least one of the second devices which are connected to receiving means indicative of a higher-order received-signal for providing an output signal only when the first-device-associated-receiving-means has a received signal of a first value and all of the higher order receiving means have a signal of said other one value; the devices being interconnected such that only one output signal is provided from the first and second signals; and means operatively associated with said device for receiving the output signals and being responsive to said one output signal for performing a digital signal manipulation which is peculiarly associative with one first-valued signal which is in the receiving means of greater significance than all other receiving means having a first-valued signal.

23. Ordered digit analyzing apparatus for the determination of the highest ordered digit position of a digital input word, each digit representative of an associated electronic data processing system requesting utilization comprising: input means containing at least bilevel signals representative of a digital input word associative of an ordered digit position; a matrix array of data storage devices arranged in rows and columns; said input means coupled to selected ones of said devices; all devices in a first row being in a storage state related digit-by-digit to the digital input word and the devices in each of the other rows being in a storage state related digit-by-digit to the complement of the word of said first row; a plurality of output means each coupled to at least one of said devices in the first row and selected ones in the other rows such that only the output means contain signals representative of a digital output word which contains only the signal representative of a predesignated highest ordered digit position of said digital input word.

24. Ordered digit analyzing apparatus comprising: an input register of $n$ digit positions for containing a digital word input representative of an ordered digital priority; a matrix array of data storage devices arranged in $n$ rows and $n$ columns; means coupling each input register digit position to all data storage devices of the respective columns for receiving signals from said input word; means coupling a first device of each column forming a first row of such devices for containing a digital word related digit-by-digit to said input word; each additional row containing a digital word related digit-by-digit to the complement of said input word; interrogation means; $n$ output conductor means; $n$ pairs of conductor means; a first pair of conductor means coupling a device of a first row and a first column to a first of said output conductor means and to said interrogation means; another pair of conductor means coupling a device of a first row and a second column and a device of a second row and a first column to a second of said output conductor means and to said interrogation means, and a plurality of succeeding pairs of conductor means, said pairs respectively coupling succeeding devices of said first row to one additional number of devices of succeeding rows, the output on said output conductor means representative of only the highest ordered digit denoted in said input word.

25. Ordered digit analyzing apparatus comprising: an input register of $n$ digit positions for containing a digital signal input word representative of the ordered digits; a plurality of data storage devices; means coupling at least two data storage devices to each of $n-1$ positions of said input register; means coupling at least one data storage device to the $n$th which is defined as the highest ordered position; one data storage device associated with each of the first through the $n-1$ positions containing as a row a digital word related digit-by-digit to said input word; one data storage device of each of the first through the $n$th positions containing as other rows a digital word related digit-by-digit to the one's complement of said input word; interrogation means; output conductor means; pairs of conductor means; a first pair of conductor means coupling a device of a first row and a second column and a device of a second row and a first column to a first of said output conductor means and to said interrogation means; a second pair of conductor means coupling a device of said first row and a third column to devices of a third row and said second column and of said third row and said first column to a second of said output conductor means and to said interrogation means, and $n-2$ succeeding pairs of conductor means respectively coupling each succeeding device of said first row to one additional number of devices of succeeding rows, the output on said output conductor means representative of only the highest ordered digit position denoted in said input word.

References Cited in the file of this patent

UNITED STATES PATENTS

| | | |
|---|---|---|
| 2,792,563 | Rajchman | May 14, 1957 |
| 2,846,671 | Yetter | Aug. 5, 1958 |
| 2,919,432 | Broadbent | Dec. 29, 1959 |
| 2,920,317 | Mallery | Jan. 5, 1960 |
| 2,934,746 | Way Dong Woo | Apr. 26, 1960 |